(12) United States Patent
O'Brien et al.

(10) Patent No.: US 9,734,999 B2
(45) Date of Patent: Aug. 15, 2017

(54) GASKET SEAL FOR A MASS SPECTROMETER

(71) Applicant: Micromass UK Limited, Wilmslow (GB)

(72) Inventors: Stephen O'Brien, Manchester (GB); Ian Trivett, Cheadle (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 15/022,691

(22) PCT Filed: Sep. 17, 2014

(86) PCT No.: PCT/GB2014/052827
§ 371 (c)(1),
(2) Date: Mar. 17, 2016

(87) PCT Pub. No.: WO2015/040393
PCT Pub. Date: Mar. 26, 2015

(65) Prior Publication Data
US 2016/0233072 A1    Aug. 11, 2016

(30) Foreign Application Priority Data

Sep. 20, 2013 (EP) .................................... 13185328
Sep. 20, 2013 (GB) .................................. 1316709.3

(51) Int. Cl.
*H01J 49/26* (2006.01)
*H01J 49/24* (2006.01)
*F16J 15/06* (2006.01)
*H01J 49/00* (2006.01)

(52) U.S. Cl.
CPC ............. *H01J 49/24* (2013.01); *F16J 15/061* (2013.01); *H01J 49/0027* (2013.01)

(58) Field of Classification Search
CPC .. B01L 3/50825; G01N 35/1079; H01J 49/24; H01J 49/0027; H01J 49/02; H01J 49/04; H01J 49/26; F16J 15/061
USPC ................................................. 250/281, 282
See application file for complete search history.

(56) References Cited

U.S. PATENT DOCUMENTS

| 6,325,388 | B1 * | 12/2001 | Shattuck ................ F16J 15/106 277/591 |
| 6,525,314 | B1 | 2/2003 | Jarrell et al. |
| 7,329,865 | B2 | 2/2008 | Kuypers |
| 8,227,765 | B2 | 7/2012 | Syms |
| 2002/0124897 | A1 * | 9/2002 | Bergh ........................ F15C 5/00 137/885 |
| 2011/0000986 | A1 * | 1/2011 | Syms .................. H01J 49/0018 239/690 |
| 2011/0139113 | A1 | 6/2011 | Miller et al. |

(Continued)

FOREIGN PATENT DOCUMENTS

GB    2363517    12/2001

*Primary Examiner* — Nicole Ippolito
(74) *Attorney, Agent, or Firm* — Diederiks & Whitelaw, PLC

(57) ABSTRACT

A gasket seal for a mass spectrometer is disclosed. The gasket seal comprises a membrane having an outer profile and an inner profile and one or more protrusions. One or more ports are provided in the body of the membrane. In use a gas or fluid is supplied through at least one of the one or more ports via at least one of the one or more protrusions.

30 Claims, 8 Drawing Sheets

(56) References Cited

U.S. PATENT DOCUMENTS

2014/0083544 A1* 3/2014 Chan ................... G05D 7/03
                                                137/872

* cited by examiner

GASKET SEAL FOR A MASS SPECTROMETER

CROSS REFERENCE TO RELATED APPLICATIONS

This application is the National Stage of International Application No. PCT/GB2014/052827, filed 17 Sep. 2014 which claims priority from and the benefit of United Kingdom patent application No. 1316709.3 filed on 20 Sep. 2013 and European patent application No. 13185328.5 filed on 20 Sep. 2013. The entire contents of these applications are incorporated herein by reference.

BACKGROUND OF THE PRESENT INVENTION

The present invention relates to a gasket seal for a mass spectrometer.

It is known to use one or more O-rings to form an air tight or vacuum tight seal between two components of a mass spectrometer. The O-rings are manufactured from VITON® or another similar elastomer material. In particular, it is known to utilise an O-ring seal with a mass spectrometer where a pressure differential needs to be maintained e.g. between two vacuum chambers or between a vacuum chamber and the atmosphere.

It is known to utilise multiple separate O-ring seals in order provide multiple gas seals between two components of a mass spectrometer. For example, two or more O-rings may be provided between two mating surfaces of a mass spectrometer wherein each O-ring seals a separate specific region.

It will be understood by those skilled in the art that with conventional arrangements it is necessary to locate each O-ring seal separately and also to ensure that each O-ring seal has its own seating profile.

Many conventional mass spectrometers have complex sealing arrangements which utilise multiple O-ring seals, each of which need to be positioned carefully. The O-ring seals may also be subject to different tolerances. It is problematic to ensure that multiple O-ring seals are properly located.

Another problem with known mass spectrometers is that each location where an O-ring is to be provided requires careful dimension control in order to ensure that each O-ring will provide, in use, a gas or vacuum tight seal under compression. It will be appreciated by those skilled in the art that this can be difficult since different seal locations may have different tolerances and may be subjected to different temperature and pressure variations.

Another problem with known arrangements is that any variation across multiple seals can result in the lifting off of some of the seals or regions of reduced compression being formed. This can lead to leaks (in effect some seals can hold off nearby seals) which can also be difficult to locate.

It will be apparent that conventional mass spectrometers which incorporate multiple O-ring seals in close proximity to each other often involve complex designs which are complex to manufacture and assemble. An O-ring seal may also be prone to failure if a neighbouring O-ring seal is positioned incorrectly.

The complexity of using multiple O-ring seals and ensuring that each of the O-rings is positioned correctly and provides the correct seal under compression results in increased manufacturing costs. Conventional mass spectrometers incorporating multiple O-ring seals are also relatively complex and time consuming to service.

Another problem with locating multiple O-ring seals in close proximity to each other is that there is an increased risk of one (or more) of the O-ring seals being missed out during assembly of the mass spectrometer.

Another problem with conventional arrangements is that although during assembly the correct number of O-ring seals may be used, it is possible that two O-ring seals having slightly different sizes or tolerances may be inadvertently swapped.

It will be apparent that assembly of a mass spectrometer wherein one or more O-ring seals are either missing or located in the wrong position can be particularly problematic and may require extensive disassembly and reassembly of the mass spectrometer which is both time consuming and a skilled operation.

GB-2471520 (Syms) discloses an electrospray ionisation source that is attached to a mounting by a planar gasket. An input channel for a stream of nebuliser gas and a socket for mounting a liquid carrying capillary is provided in the gasket. The planar gasket disclosed in GB-2471520 (Syms) may suffer from leaks, especially in the areas surrounding the input channel. This will be particularly true if a high pressure gas is passed through the input channel. Leaks may occur, for example, if the ionisation source and mounting move apart from one another. Furthermore, if the ionisation source and/or mounting were to move laterally relative to the gasket or to one another then the stream of nebuliser gas would be inhibited. This would not only impact the operation of the ionisation source but would also promote leaks due to a potential build up of pressure.

It is desired to provide an improved mass spectrometer.

SUMMARY OF THE PRESENT INVENTION

According to an aspect of the present invention there is provided a gasket seal for a mass spectrometer, wherein the gasket seal comprises:

a membrane having an outer profile and an inner profile; and one or more protrusions;

wherein one or more ports are provided in the body of the membrane, and wherein in use a gas or fluid is supplied through at least one of the one or more ports via at least one of the one or more protrusions.

The preferred embodiment of the present invention relates to a gasket seal for a mass spectrometer. The preferred gasket seal comprises one or more ports provided in the body of the gasket seal through which a gas or fluid may be supplied.

The preferred gasket seal not only provides a gas tight or vacuum tight seal between two components of a mass spectrometer but also allows a high pressure gas or a liquid to be passed through it. The preferred gasket seal preferably comprises a single membrane which effectively performs the same function as multiple separate conventional O-ring seals. The use of a single seal to perform multiple functions simplifies the design, manufacture and assembly of the mass spectrometer.

According to the preferred embodiment of the present invention, the gasket seal further comprises one or more protrusions arranged and adapted such that a gas or fluid may be supplied though at least one of the one or more ports via the one or more protrusions.

The one or more protrusions advantageously reduce the number of possible seal leak points that would otherwise be present. In the preferred embodiment, the one or more protrusions are arranged so as to protrude into a gas or fluid line of one or both of the components that are sealed by the gasket. This then means that advantageously, movement of one or both of the components relative to the gasket seal is less likely to result in a leak or to inhibit the flow of gas or fluid through the one or more ports. This is particularly useful in embodiments in which a high pressure gas or fluid is supplied via the one or more ports.

The preferred embodiment therefore enables an improved mass spectrometer to be provided.

In an embodiment, the membrane is arranged substantially in a first plane, and:
at least one of the protrusions extends from the membrane in a direction orthogonal to the first plane; and/or
at least one of the protrusions extends from the membrane in a direction that is not orthogonal to the first plane.

In an embodiment, the membrane is arranged substantially in a first plane, and:
an end surface of at least one of the protrusions is parallel to the first plane; and/or
an end surface of at least one of the protrusions is not parallel to the first plane.

In an embodiment, the end surface of the at least one of the protrusions comprises a sealing surface.

In an embodiment, at least a portion of at least one of the protrusions is substantially straight, non-straight, curved, angled or kinked.

In an embodiment, the one or more ports are located in the membrane between the outer profile and the inner profile.

In an embodiment, the outer profile is substantially circular or non-circular.

In an embodiment, the inner profile is substantially circular or non-circular.

In an embodiment, at least one of the ports comprises a high pressure gas port or a gas port.

In an embodiment, the gasket seal further comprises a device arranged and adapted to supply a cone gas, calibration gas or other gas through the at least one of the one or more ports via the at least one of the one or more protrusions.

In an embodiment, at least one of the ports comprises a liquid port.

In an embodiment, the gasket seal further comprises a device arranged and adapted to supply a solvent or other liquid through the at least one liquid port.

In an embodiment, the gasket seal further comprises one or more apertures provided in the body of the membrane.

In an embodiment, the one or more apertures are located between the outer profile and the inner profile.

In an embodiment, in use one or more fixings pass through the one or more apertures.

According to another aspect of the present invention there is provided a mass spectrometer comprising:
a first component;
a second component; and
one or more gasket seals as described above, wherein the one or more gasket seals are located between the first component and the second component.

In an embodiment, the first component comprises a first mating surface and the second component comprises a second mating surface, wherein the one or more gasket seals are arranged and adapted to provide a gas tight seal and/or vacuum seal between the first mating surface and the second mating surface.

In an embodiment, the gasket seal is arranged and adapted to provide a gas tight seal and/or vacuum seal between the first mating surface and the second mating surface whilst under compression.

In an embodiment, at least one of the one or more protrusions is arranged and adapted to extend into the first and/or second component.

In an embodiment, at least one of the one or more protrusions is arranged and adapted to form a seal with surrounding parts or portions of the mass spectrometer.

In an embodiment, in use the gas is supplied from the first component to the second component or from the second component to the first component through the at least one of the ports via the at least one of the protrusions.

In an embodiment, the first component comprises an ion block or a first vacuum chamber and the second component comprises a pumping block, a main housing of the mass spectrometer or a second vacuum chamber.

In an embodiment, the mass spectrometer further comprises one or more third components, wherein at least one of the one or more protrusions is arranged and adapted to form a seal between the one or more third components and/or the first or second component.

In an embodiment, in use the gas is supplied from the first and/or second component to the one or more third components or from the one or more third components to the first and/or second component through the at least one of the ports via the at least one of the protrusions.

In an embodiment, the one or more third components comprises an ion inlet assembly.

In an embodiment, the mass spectrometer comprises a miniature mass spectrometer.

According to another aspect of the present invention, there is provided a method of assembling a mass spectrometer comprising:
providing a first component;
providing a second component; and
locating one or more gasket seals as described above between the first component and the second component.

According to another aspect of the present invention there is provided a mass spectrometer comprising:
an ion block having an atmospheric pressure interface;
a housing comprising one or more vacuum chambers; and
a gasket seal located between the ion block and the housing, the gasket seal comprising:
a membrane having an outer profile and an inner profile; and
a protrusion;
wherein a port is provided in the body of the membrane and wherein a gas or fluid is supplied, in use, to the atmospheric pressure interface via the port and the protrusion.

In an embodiment, the port is located between the outer profile and the inner profile.

According to another aspect of the present invention there is provided a method of mass spectrometry comprising:
providing an ion block having an atmospheric pressure interface;
providing a housing comprising one or more vacuum chambers; and
locating a gasket seal between the ion block and the housing, the gasket seal comprising:
a membrane having an outer profile and an inner profile; and
a protrusion;

wherein a port is provided in the body of the membrane, and wherein the method further comprises supplying a gas or fluid to the atmospheric pressure interface via the port and the protrusion.

According to an aspect of the present invention there is provided a gasket seal for a mass spectrometer, wherein the gasket seal comprises a membrane having an outer profile and an inner profile and wherein one or more ports are provided in the body of the membrane.

The one or more ports are located in the membrane between the outer profile and the inner profile.

The outer profile is preferably substantially circular or non-circular.

The inner profile is preferably substantially circular or non-circular.

At least one of the ports preferably comprises a high pressure gas port or a gas port.

A device is preferably provided which is arranged and adapted to supply a cone gas, calibration gas or other gas through the at least one high pressure gas port or the gas port.

At least one of the ports preferably comprises a liquid port.

A device is preferably provided which is arranged and adapted to supply a solvent or other liquid through the at least one liquid port.

One or more apertures are preferably provided in the body of the membrane.

The one or more apertures are preferably located between the outer profile and the inner profile.

According to the preferred embodiment one or more fixings preferably pass in use through the one or more apertures.

The gasket seal preferably further comprises one or more protrusions wherein in use a gas is supplied via the one or more protrusions.

According to another aspect of the present invention there is provided a mass spectrometer comprising:
 a first component;
 a second component; and
 one or more gasket seals as described above, wherein the one or more gasket seals are located between the first component and the second component.

The first component preferably comprises a first mating surface and the second component preferably comprises a second mating surface, wherein the one or more gasket seals are preferably arranged and adapted to provide a gas tight seal and/or vacuum seal between the first mating surface and the second mating surface.

The gasket seal is preferably arranged and adapted to provide a gas tight seal and/or vacuum seal between the first mating surface and the second mating surface whilst under compression.

The first component preferably comprises an ion block or first vacuum chamber and the second component preferably comprises a pumping block, a main housing of the mass spectrometer or a second vacuum chamber.

The mass spectrometer preferably comprises a miniature mass spectrometer.

According to another aspect of the present invention there is provided a method of assembling a mass spectrometer comprising:
 providing a first component;
 providing a second component; and
 locating one or more gasket seals as described above between the first component and the second component.

According to another aspect of the present invention there is provided a mass spectrometer comprising:
 an ion block having an atmospheric pressure interface;
 a housing comprising one or more vacuum chambers; and
 a gasket seal located between the ion block and the housing, the gasket seal comprising a membrane having an outer profile and an inner profile and wherein a port is provided in the body of the membrane and wherein a gas or fluid is supplied, in use, to the atmospheric pressure interface via the port.

The port is preferably located between the outer profile and the inner profile.

According to another aspect of the present invention there is provided a method of mass spectrometry comprising:
 providing an ion block having an atmospheric pressure interface;
 providing a housing comprising one or more vacuum chambers;
 locating a gasket seal between the ion block and the housing, the gasket seal comprising a membrane having an outer profile and an inner profile and wherein a port is provided in the body of the membrane; and
 supplying a gas or fluid to the atmospheric pressure interface via the port.

According to the preferred embodiment of the present invention there is provided a gasket seal for a mass spectrometer. The gasket seal preferably comprises multiple gas seal regions. This is in contrast to a conventional O-ring seal which comprises a single gas seal region.

The preferred embodiment relates to a seal which provides a vacuum or air tight seal across or between one or more chambers, preferably vacuum chambers. According to an embodiment the gasket seal may provide a gas tight or vacuum tight seal between a housing having a sub-atmospheric pressure region and the atmosphere. According to another embodiment the gasket seal may provide a gas tight or vacuum tight seal between two vacuum chambers of a mass spectrometer wherein both vacuum chambers are maintained at sub-atmospheric pressure.

According to the preferred embodiment the gasket seal may be made from VITON® rubber or another elastomer.

The preferred gasket seal is preferably arranged to perform a number of tasks. The gasket seal preferably not only provides a gas tight or vacuum tight seal between two components of a mass spectrometer but also preferably includes one or more ports in the body or membrane of the seal through which a high pressure gas or a liquid is preferably passed.

The preferred gasket seal preferably comprises multiple through holes or regions in the body of the seal or the membrane of the seal through which a gas, liquid or other fluid is passed in use.

The preferred gasket seal preferably has a smaller footprint than a conventional comparable arrangement comprising multiple separate O-ring seals.

The gasket seal according to the preferred embodiment is particularly suitable for providing a gas tight or vacuum seal in a confined space and is particularly suited for use with a miniature mass spectrometer.

The form or profile of the preferred seal preferably follows the surrounding geometry of other components of the mass spectrometer.

The preferred seal preferably has a profile which enables multiple individually sealed regions to be provided together with internal tube sections or cavities which preferably carry a gas or other fluid from one region to another.

The preferred gasket seal preferably comprises a single membrane which effectively performs the same function as multiple separate conventional O-ring seals.

The preferred seal preferably has several gas, liquid or other throughputs through the body of the seal membrane.

According to an embodiment the seal may comprise one or more protrusions which project beyond the body of the seal membrane. The one or more protrusions may be coupled to a gas supply device so that a gas is preferably directed through the body of the seal via the protrusion.

The preferred gasket seal preferably combines the task of both providing a gas or vacuum seal whilst also carrying or transporting a gas, solvent or fluid through and/or within the body of the seal.

The preferred gasket seal with multiple sealing areas is preferably capable of managing fluids and gas and may also include one or more apertures in the main body of the seal membrane through which one or more mechanical fixings may pass.

According to the preferred embodiment a single gasket is preferably used which is preferably easier to install during assembly of the mass spectrometer. It will be appreciated that using a single seal to provide a gas or vacuum tight seal between two mating surfaces of a mass spectrometer dramatically reduces any risk that a seal might be left out during assembly or else installed in the wrong location during assembly or servicing of the mass spectrometer.

The use of a single seal to perform multiple functions simplifies the design and manufacture of the supporting geometry and components of the mass spectrometer.

The gasket seal according to the preferred embodiment preferably has a small footprint and allows the corresponding assemblies to be smaller than conventional assemblies. The preferred gasket is therefore particularly advantageous for use with a miniature mass spectrometer.

Another advantage of the preferred gasket seal is that a single seal which performs multiple functions reduces the part count.

The gasket seal according to the preferred embodiment preferably includes gas transport features and preferably has a geometry which facilitates gas delivery to other components of the mass spectrometer. The seal may be used to transport gas from one region to another whilst maintaining an external seal.

According to an embodiment the mass spectrometer may further comprise:

(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; and (xxviii) a Laser Ablation Electrospray Ionisation ("LAESI") ion source; and/or (b) one or more continuous or pulsed ion sources; and/or (c) one or more ion guides; and/or (d) one or more ion mobility separation devices and/or one or more Field Asymmetric Ion Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analysers or electrostatic energy analysers; and/or (i) one or more ion detectors; and/or (j) one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter; and/or (k) a device or ion gate for pulsing ions; and/or (l) a device for converting a substantially continuous ion beam into a pulsed ion beam.

The mass spectrometer may further comprise either:

(i) a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

According to an embodiment the mass spectrometer further comprises a device arranged and adapted to supply an AC or RF voltage to the electrodes. The AC or RF voltage preferably has an amplitude selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak.

The AC or RF voltage preferably has a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz.

The mass spectrometer may also comprise a chromatography or other separation device upstream of an ion source. According to an embodiment the chromatography separation device comprises a liquid chromatography or gas chromatography device. According to another embodiment the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The mass spectrometer may comprise a chromatography detector.

The chromatography detector may comprise a destructive chromatography detector preferably selected from the group consisting of: (i) a Flame Ionization Detector ("FID"); (ii) an aerosol-based detector or Nano Quantity Analyte Detector ("NQAD"); (iii) a Flame Photometric Detector ("FPD"); (iv) an Atomic-Emission Detector ("AED"); (v) a Nitrogen Phosphorus Detector ("NPD"); and (vi) an Evaporative Light Scattering Detector ("ELSD").

Additionally or alternatively, the chromatography detector may comprise a non-destructive chromatography detector preferably selected from the group consisting of: (i) a fixed or variable wavelength UV detector; (ii) a Thermal Conductivity Detector ("TCD"); (iii) a fluorescence detector; (iv) an Electron Capture Detector ("ECD"); (v) a conductivity monitor; (vi) a Photoionization Detector ("PID"); (vii) a Refractive Index Detector ("RID"); (viii) a radio flow detector; and (ix) a chiral detector.

The ion guide is preferably maintained at a pressure selected from the group consisting of: (i) <0.0001 mbar; (ii) 0.0001-0.001 mbar; (iii) 0.001-0.01 mbar; (iv) 0.01-0.1 mbar; (v) 0.1-1 mbar; (vi) 1-10 mbar; (vii) 10-100 mbar; (viii) 100-1000 mbar; and (ix) >1000 mbar.

According to an embodiment analyte ions may be subjected to Electron Transfer Dissociation ("ETD") fragmentation in an Electron Transfer Dissociation fragmentation device. Analyte ions are preferably caused to interact with ETD reagent ions within an ion guide or fragmentation device.

According to an embodiment in order to effect Electron Transfer Dissociation either: (a) analyte ions are fragmented or are induced to dissociate and form product or fragment ions upon interacting with reagent ions; and/or (b) electrons are transferred from one or more reagent anions or negatively charged ions to one or more multiply charged analyte cations or positively charged ions whereupon at least some of the multiply charged analyte cations or positively charged ions are induced to dissociate and form product or fragment ions; and/or (c) analyte ions are fragmented or are induced to dissociate and form product or fragment ions upon interacting with neutral reagent gas molecules or atoms or a non-ionic reagent gas; and/or (d) electrons are transferred from one or more neutral, non-ionic or uncharged basic gases or vapours to one or more multiply charged analyte cations or positively charged ions whereupon at least some of the multiply charged analyte cations or positively charged ions are induced to dissociate and form product or fragment ions; and/or (e) electrons are transferred from one or more neutral, non-ionic or uncharged superbase reagent gases or vapours to one or more multiply charged analyte cations or positively charged ions whereupon at least some of the multiply charge analyte cations or positively charged ions are induced to dissociate and form product or fragment ions; and/or (f) electrons are transferred from one or more neutral, non-ionic or uncharged alkali metal gases or vapours to one or more multiply charged analyte cations or positively charged ions whereupon at least some of the multiply charged analyte cations or positively charged ions are induced to dissociate and form product or fragment ions; and/or (g) electrons are transferred from one or more neutral, non-ionic or uncharged gases, vapours or atoms to one or more multiply charged analyte cations or positively charged ions whereupon at least some of the multiply charged analyte cations or positively charged ions are induced to dissociate and form product or fragment ions, wherein the one or more neutral, non-ionic or uncharged gases, vapours or atoms are selected from the group consisting of: (i) sodium vapour or atoms; (ii) lithium vapour or atoms; (iii) potassium vapour or atoms; (iv) rubidium vapour or atoms; (v) caesium vapour or atoms; (vi) francium vapour or atoms; (vii) C60 vapour or atoms; and (viii) magnesium vapour or atoms.

The multiply charged analyte cations or positively charged ions preferably comprise peptides, polypeptides, proteins or biomolecules.

According to an embodiment in order to effect Electron Transfer Dissociation: (a) the reagent anions or negatively charged ions are derived from a polyaromatic hydrocarbon or a substituted polyaromatic hydrocarbon; and/or (b) the reagent anions or negatively charged ions are derived from the group consisting of: (i) anthracene; (ii) 9,10 diphenyl-anthracene; (iii) naphthalene; (iv) fluorine; (v) phenanthrene; (vi) pyrene; (vii) fluoranthene; (viii) chrysene; (ix) triphenylene; (x) perylene; (xi) acridine; (xii) 2,2' dipyridyl; (xiii) 2,2' biquinoline; (xiv) 9-anthracenecarbonitrile; (xv) dibenzothiophene; (xvi) 1,10'-phenanthroline; (xvii) 9' anthracenecarbonitrile; and (xviii) anthraquinone; and/or (c) the reagent ions or negatively charged ions comprise azobenzene anions or azobenzene radical anions.

According to a particularly preferred embodiment the process of Electron Transfer Dissociation fragmentation comprises interacting analyte ions with reagent ions, wherein the reagent ions comprise dicyanobenzene, 4-nitro-toluene or azulene.

BRIEF DESCRIPTION OF THE DRAWINGS

Various embodiments of the present invention, together with other arrangements given for illustrative purposes only, will now be described, by way of example only, and with reference to the accompanying drawings in which.

DETAILED DESCRIPTION OF PREFERRED EMBODIMENTS

A preferred embodiment of the present invention will now be described with reference to FIG. 1.

Figure 1:
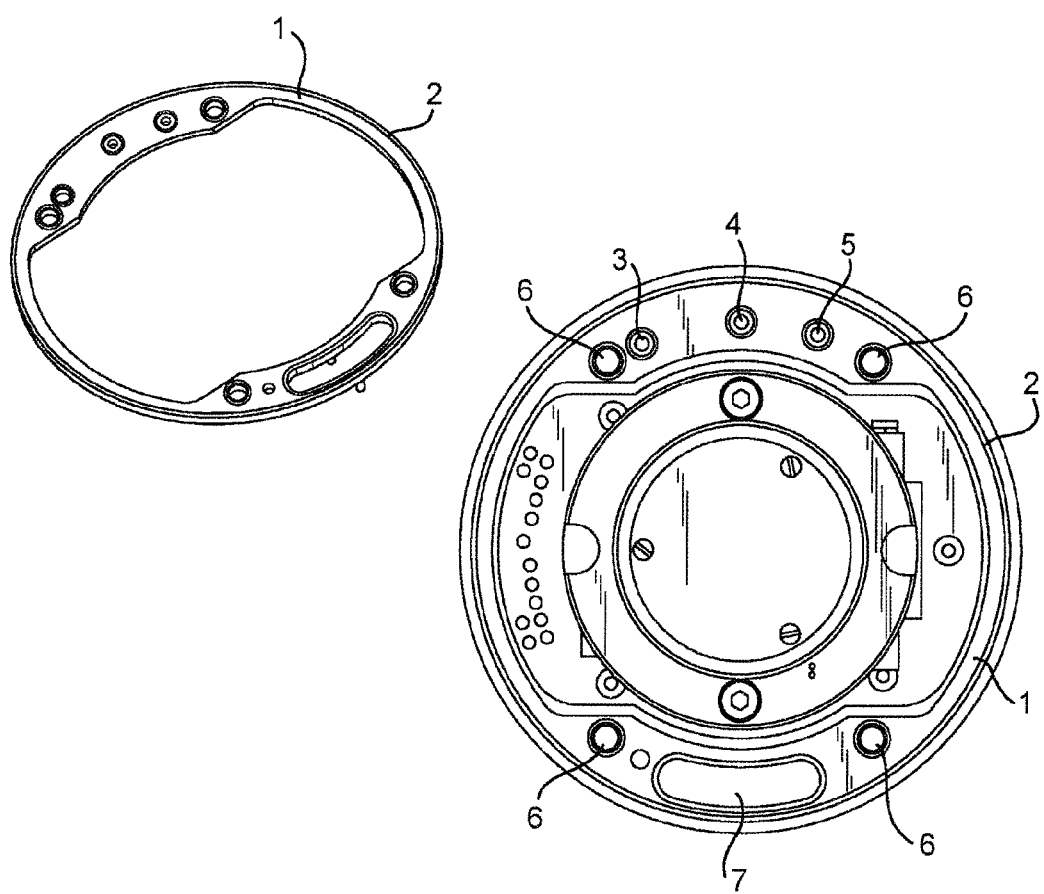
FIG. 1 shows a gasket seal according to a preferred embodiment of the present invention which forms a seal between an ion block of a miniature mass spectrometer and a pumping block of the miniature mass spectrometer.

FIG. 1 shows a main gasket seal 1 according to an embodiment of the present invention which has multiple gas seal regions formed within the body of the seal 1. The preferred gasket 1 is arranged to perform with a range of different media flowing through the gasket 1. The gasket 1 may also be subjected to a wide range of pressures and temperatures.

The gasket seal 1 as shown in FIG. 1 is preferably located on the rear surface of a pumping block (or ion source and vacuum housing interface) which is secured by fasteners to the main body of a mass spectrometer. The gasket seal 1 is preferably compressed in use when secured between the pumping block and the main body of the mass spectrometer. The outer lip 2 of the seal 1 preferably provides the main vacuum seal between the reduced pressure region within the pumping block and the vacuum within the vacuum chambers located in the main body of the mass spectrometer.

The preferred gasket seal 1 is particularly suitable for incorporation into small geometric spaces where the use of individual O-ring seals would be problematic. The preferred gasket seal 1 is easy to fit and manufacture and is particularly suited for use with miniature mass spectrometers.

A particularly preferred aspect of the present invention is that one or more ports are provided in the membrane of the gasket seal 1. For example, as shown in FIG. 1 a cone gas port 3 may be provided in the gasket seal 1 through which a cone gas is preferably supplied under pressure to an annular region formed between a sampling cone and a gas cone.

One or more further ports may be provided in the membrane of the gasket seal 1. For example, as shown in FIG. 1 a pressure port 4 and/or a calibration gas port 5 may also be provided.

The seal 1 as shown in FIG. 1 preferably includes a number of apertures 6 formed in the body of the seal 1 through which a fixing or fastener may be passed in use. In the particular example shown in FIG. 1 four apertures 6 are provided and a fastener such as an allen bolt preferably passes through each aperture 6 in order to secure the ion block to a pumping block of the mass spectrometer. This also compresses the seal 1.

The seal 1 may include a relatively large aperture 7 which is preferably provided in the body of the seal 1 and which is preferably used as a port through which exhaust gas and solvent may escape.

The seal 1 ensures that a gas tight and vacuum seal is preferably maintained with the apertures 6 through which fixings pass and the relatively large aperture 7 through which exhaust gas and solvent escapes.

The preferred seal or gasket 1 preferably enables gas or fluid to be transported through ports provided in the membrane forming the seal 1 without breaking the vacuum and gas seal which is otherwise provided by the seal 1.

The gasket or seal 1 is preferably housed within a geometry which preferably has a form which complements the geometry of the seal 1. The surrounding housing preferably includes a device which delivers the gas and/or fluids to the correct region.

The seal 1 is preferably mechanically held in place under clamping pressure using mechanical fixings. The mechanical fixings are preferably sealed off to avoid leaks through these locations.

The precise shape or form of the preferred seal or gasket 1 can be adapted to meet the needs of different applications. A particularly preferred aspect of the present invention is that the gasket seal 1 may include one or more protrusions which form a gas port through the gasket seal 1. The shape, length and location of the protrusions for gas transfer may vary.

According to an embodiment the material or compound used to form the seal 1 may comprise different compounds or elastomers.

The preferred seal 1 can be used in various different applications where gas and/or fluids require sealing.

Figure 2:
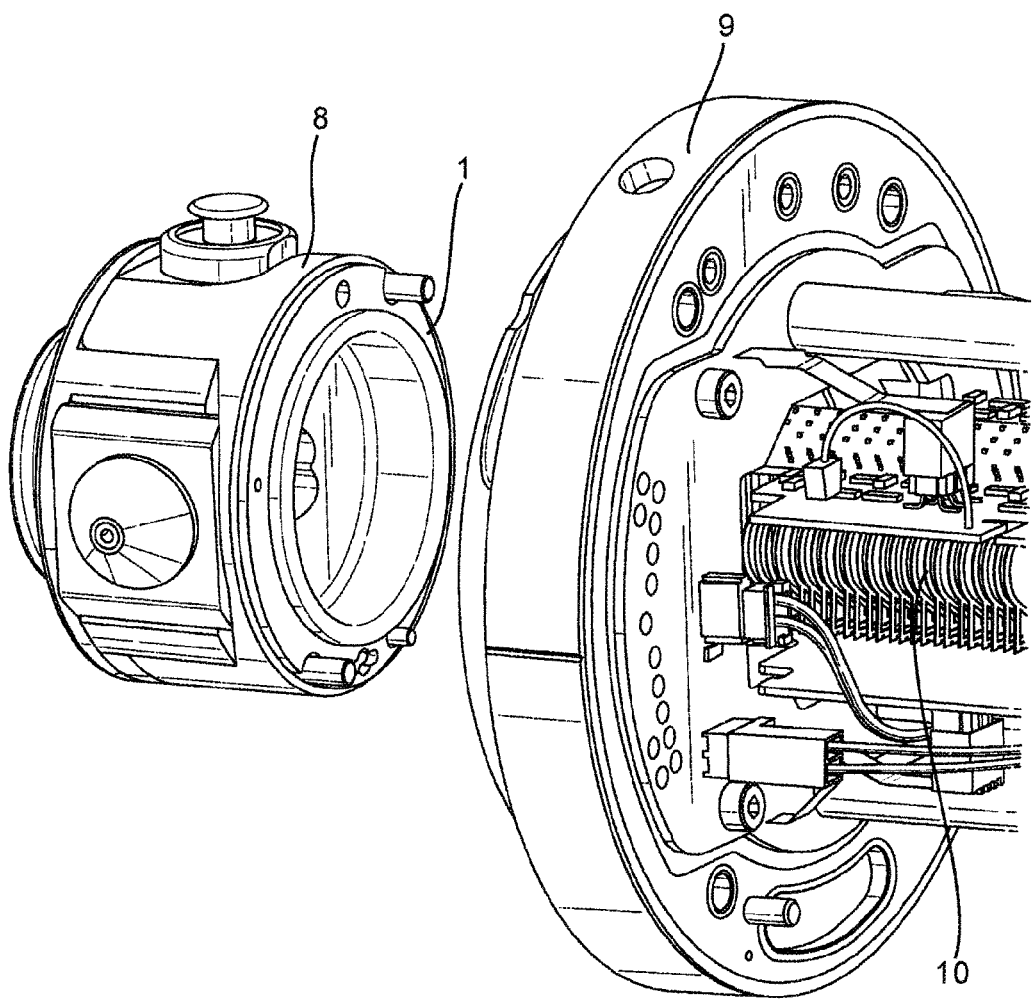
FIG. 2 shows a gasket seal according to an embodiment of the present invention wherein the gasket seal is positioned on the rear of an ion block of a miniature mass spectrometer and is arranged to form a seal with a pumping block of the mass spectrometer.

FIG. 2 shows a particularly preferred embodiment wherein a gasket seal 1 is used to provide a gas tight and vacuum tight seal between an ion block 8 of a miniature mass spectrometer and a pumping block 9 of the miniature mass spectrometer. The pumping block 9 is attached to the main housing of the mass spectrometer. One or more vacuum chambers are provided within the main housing of the mass spectrometer. An ion guide 10 is shown in FIG. 2 in a vacuum chamber provided within the main housing of the mass spectrometer. A mass analyser (not shown) is provided within a downstream vacuum chamber. The preferred seal 1 has multiple gas seal regions within the body of the main seal 1.

Figure 3:
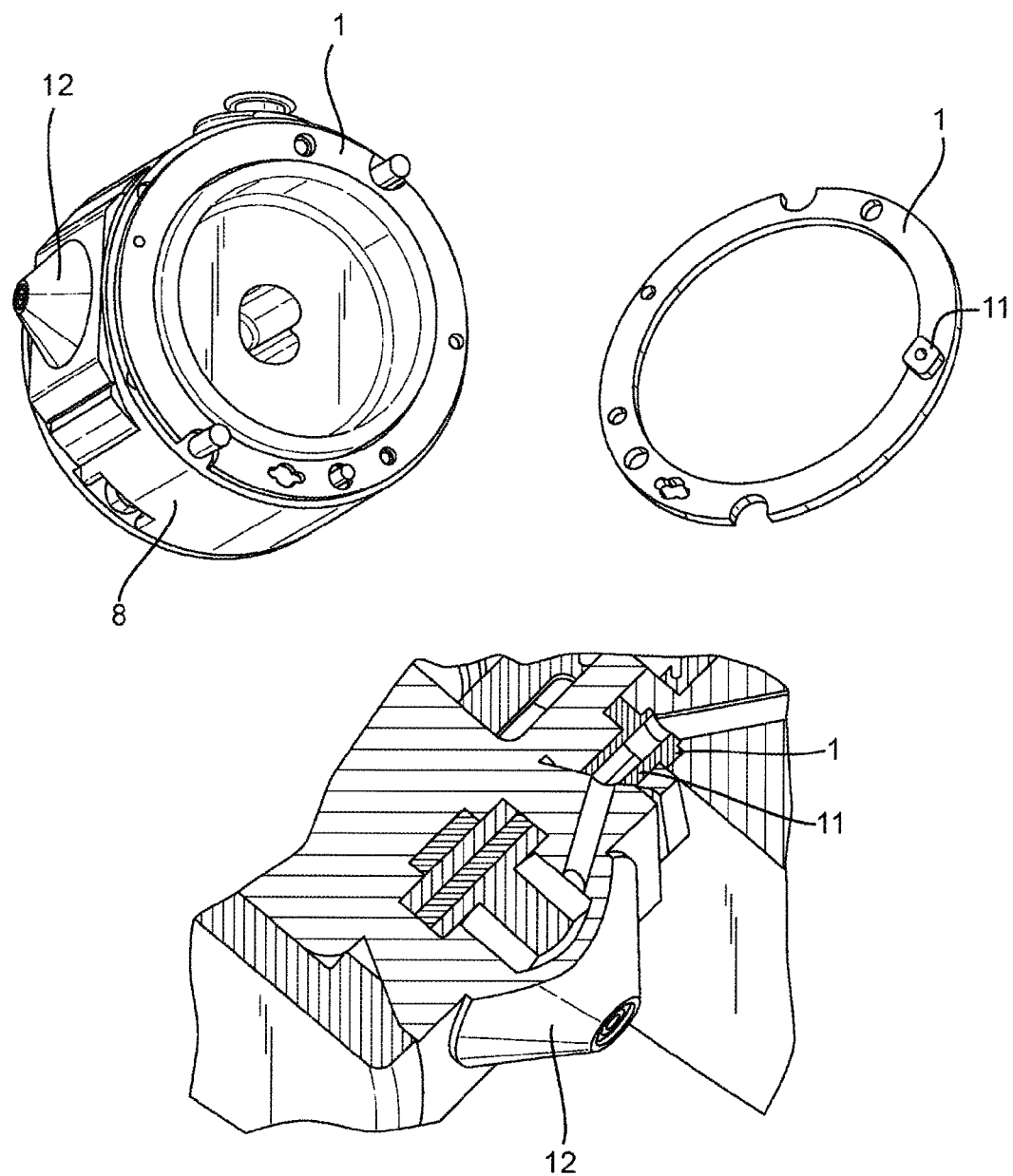
FIG. 3 shows a gasket seal according to an embodiment of the present invention wherein the gasket seal includes a protrusion through which a cone gas is supplied to an annular region between a sampling cone and a gas cone.

FIG. 3 shows in more detail the preferred seal 1 located on the rear surface of an ion block 8 and which forms a gas tight and vacuum seal with a pumping block 9 of a miniature mass spectrometer. The seal 1 preferably includes one or more rubber protrusions 11. The one or more protrusions 11 preferably carry a gas in use and at the same time form a seal with surrounding parts or portions of the mass spectrometer. In the particular example shown in FIG. 3, a cone gas (e.g. nitrogen, air, carbon dioxide or sulphur hexafluoride ("$SF_6$")) is preferably supplied to an annular region formed between an inner sampling cone (not shown) and an outer gas cone 12. The cone gas is preferably supplied to the annular region via the protrusion 11 in the gasket seal 1.

Figure 4:
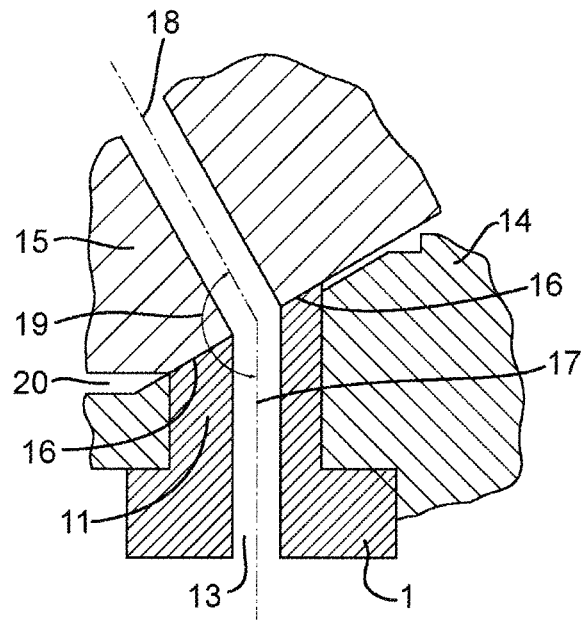
FIG. 4 shows a gasket seal according to an embodiment of the present invention wherein an end sealing surface of the protrusion is not parallel to the plane in which the main body of the gasket seal lies.

FIG. 4 shows a seal 1 having a port 13 provided in the main body of the seal 1 in accordance with a preferred embodiment. The main body of the seal 1 is preferably used to provide a gas tight and vacuum tight seal between first and second components of a mass spectrometer (e.g. between the ion block 8 and the pumping block 9), as discussed above. A protrusion 11 is provided and preferably forms part of the port 13, i.e. such that a gas or fluid may be supplied through the port 13 via the protrusion 11. The protrusion 11 preferably comprises a tube extending from the main body of the seal 1.

According to the preferred embodiment, the protrusion 11 is arranged so as to reduce the number of potential seal leak points in the mass spectrometer. As shown in FIG. 4, the protrusion 11 preferably acts to reduce the number of possible leak points between the seal 1 and one of the components of the mass spectrometer, e.g. first component 14 into which the protrusion 11 preferably extends. As will be appreciated by those skilled in the art, movement of the first component 14 with respect to the seal 1 is less likely to cause a leak because of the protrusion 11.

According to a preferred embodiment, the protrusion 11 is also used to provide an additional seal between the first component 14 and a third component 15 of the mass spectrometer. The first 14 and third 15 components are preferably separate components of the mass spectrometer. In one embodiment, the first component 14 comprises a portion of the ion block 8, and the third component 15 comprises a portion of an ion inlet assembly such as gas cone 12.

Preferably, the protrusion 11 is arranged to extend through the first component 14 and preferably beyond the first component 14. The protrusion 11 is preferably relatively thick and self-supporting. The portion of the protrusion 11 that extends beyond the first component 14 is preferably arranged to contact the third component 15, preferably at an end surface 16 of the protrusion, so as to form a gas tight seal with the third component 15.

In an embodiment the surfaces of the first component 14 and the third component 15 that are sealed by the protrusion 11 are parallel with the surfaces of the first component 14 and the second component (not shown in FIG. 4) that are sealed by the main body of the seal 1, i.e. parallel with the plane in which the main body of the seal 1 lies. As shown in FIG. 4, in another embodiment the surfaces of the first component 14 and the third component 15 that are sealed by the protrusion 11 are not parallel with the surfaces of the first component 14 and the second component (not shown in FIG. 4) that are sealed by the main body of the seal 1, i.e. not parallel with the plane in which the main body of the seal 1 lies.

In an embodiment, the end sealing face 16 of the protrusion 11 is orthogonal to the axis along which the protrusion 11 extends, i.e. parallel to the plane in which the main body of the seal 1 lies. As shown in FIG. 4, in another embodiment, the end surface 16 of the protrusion 11 is not orthogonal to the axis along which the protrusion 11 extends, i.e. not parallel to the plane in which the main body of the seal 1 lies.

A first gas or fluid path 17 is preferably provided through the first component 14 via the port 13 and the protrusion 11. A second gas or fluid path 18 is preferably provided through the third component 15. The second gas or fluid path 18 is preferably a continuation of the first gas or fluid path 17, i.e. such that a gas or fluid may be supplied through the first component 14 and the second component 15. In an embodiment, the first 17 and second 18 paths are aligned and parallel. As shown in FIG. 4, in another embodiment the first 17 and second 18 paths are not parallel. The angle 19 between the first 17 and second 18 paths can be selected as desired.

In an embodiment, the first 14 and third 15 components are arranged to contact one another. As shown in FIG. 4, in another embodiment, a gap 20 may provided between the first component 14 and the third component 15. In this embodiment, the third component 15 is preferably supported in its position relative to the first component 14, preferably without compressive forces between the two components, e.g. by a supporting means or clamp. Advantageously, the protrusion 11 will still form a gas tight seal in this arrangement.

This is in contrast with conventional arrangements such as the arrangement disclosed in GB-2471520 (Syms) in which the components must be clamped together under compression in order to effect a seal.

It will furthermore be appreciated that the tolerance for movement of the two components relative to one another without breaching the seal is particularly high for the preferred gasket seal 1. Again, this is in contrast to conventional sealing arrangements.

In an embodiment, e.g. as depicted in FIG. 4, the axis along which the protrusion 11 extends is orthogonal to the plane in which the main body of the seal 1 lies.

Figure 5:
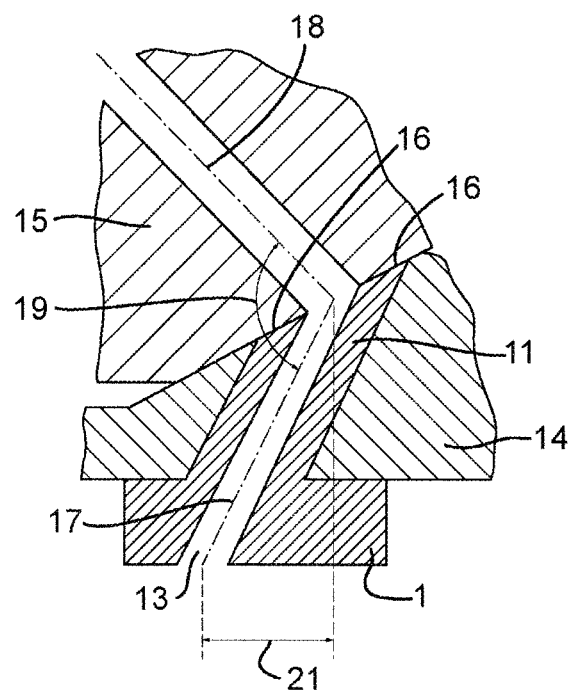
FIG. 5 shows a gasket seal according to an embodiment of the present invention wherein the axis along which the protrusion extends from the main body of the gasket is not orthogonal to the plane in which the main body of the gasket seal lies.

FIG. 5 shows a seal 1 in accordance with another preferred embodiment. The seal 1 in this embodiment is similar to the seal 1 illustrated in FIG. 4, except that the protrusion 11 extends from the main body of the seal 1 at an acute angle. That is, the axis along which the protrusion 11 extends is preferably not orthogonal to the plane in which the main body of the seal 1 lies. The angle at which the protrusion 11 extends from the main body of the seal 1 can be selected as desired. In this embodiment, preferably the port 13 and the end of the protrusion 11 are offset in a direction parallel to the plane in which the main body of the seal 1 lies. The distance 21 of the offset can be selected as desired.

Figure 6:
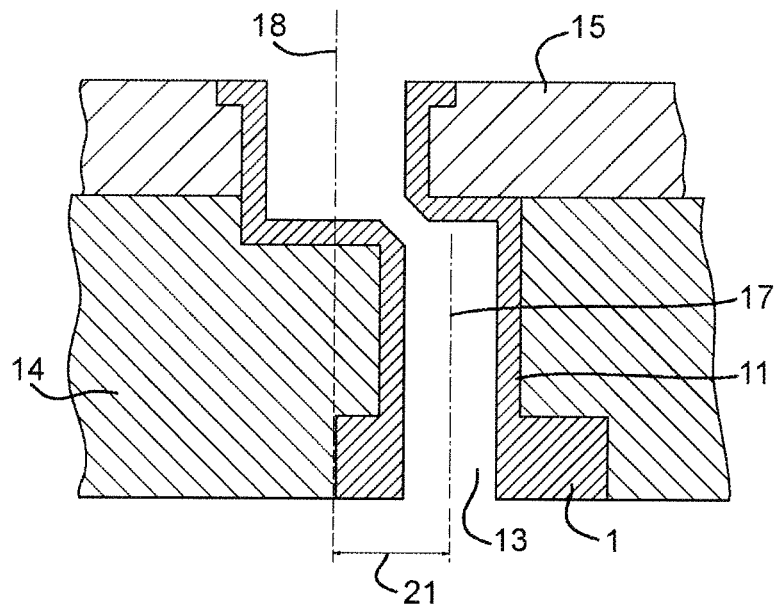
FIG. 6 shows a gasket seal according to an embodiment of the present invention wherein the protrusion is kinked so as to connect non-aligned gas or fluid lines.

FIG. 6 shows another embodiment where an offset 21 is provided between the port 13 and the end of the protrusion 11. However, in this embodiment, the first path 17 and the second path 18 are preferably parallel. In this embodiment, the protrusion 11 is preferably arranged and adapted so as to be kinked.

Furthermore, as illustrated by FIG. 6, in an embodiment the protrusion 11 is arranged and adapted to extend into the third component 15. This advantageously can further reduce the number of leak points. The end of the protrusion 11 may extend beyond the third component 15 and/or may make a seal with a fourth component (not shown). Thus, in an embodiment, the protrusion 11 may be arranged to pass through a plurality of separate components of the mass spectrometer.

Each of the preferred features of the protrusion 11 described above in relation to FIGS. 4-6 may be combined in any manner as desired. Thus, it will be appreciated that the preferred seal 1 comprising one or more protrusions 11 can advantageously be used to form a seal in wide range of situations and instrument geometries. For example, the fluid or gas lines that are connected via the seal 1 need not be parallel and/or aligned. Furthermore, the preferred seal 1 advantageously reduces the number of possible seal leak points that would otherwise be present.

Figure 7:
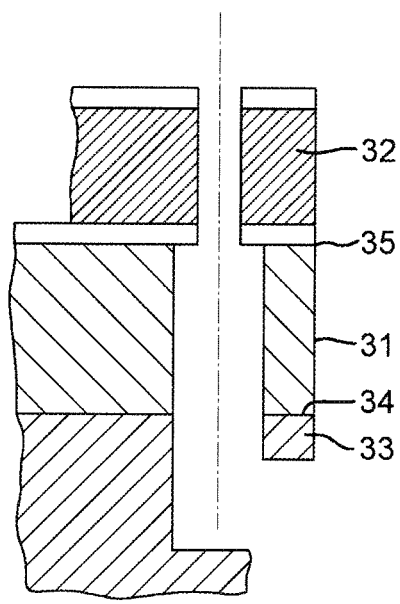
FIG. 7 shows a conventional gasket seal arrangement.

This is illustrated by FIG. 7, which shows a conventional gasket 31 as disclosed in GB-2471520 (Syms) and which is arranged between an electrospray ionisation source 32 and a mounting 33. In contrast with the preferred embodiment of the present invention, the gasket 31 is not provided with a protrusion. Thus, potential seal leak points exist, for example, at locations 34, 35. Furthermore, in order to form a seal, the channels through the electrospray ionisation source 32, the gasket 31 and the mounting 33 must be aligned and parallel, and the electrospray ionisation source 32 and the mounting 33 must be clamped together. The provision of one or more protrusions 11 in the preferred embodiment can avoid such potential leak points and can facilitate sealing in a wide variety of instrument geometries using a single seal.

Figure 8:
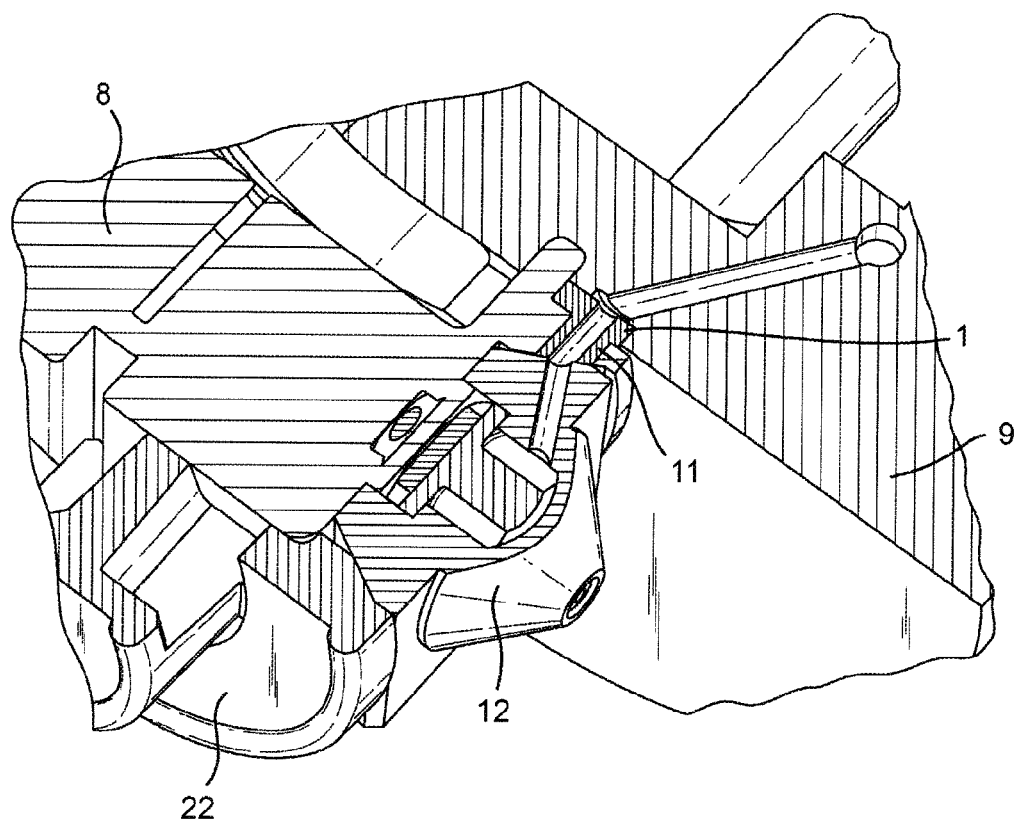
FIG. 8 shows a gasket seal according to an embodiment of the present invention located in a mass spectrometer wherein a gas cone is attached to an ion block with a clamp.

FIG. 8 shows in more detail the preferred seal 1 located in a mass spectrometer in accordance with a preferred embodiment. The main body of the preferred seal 1 is preferably arranged to form a gas tight and vacuum seal between the ion block 8 and the pumping block 9, as discussed above.

The protrusion 11 is preferably arranged to pass through the body of the ion block 8, and to extend beyond the outer face of the ion block 8. A gap between the gas cone 12 and the ion block 8 is preferably bridged by the portion of the protrusion 11 that extends beyond the ion block 8. The top of the protrusion that sits above the face of the ion block 8 preferably contacts the gas cone 12 so as to form a gas tight and vacuum seal with the gas cone 12, preferably with only one contact face.

The gas cone 12 is preferably held in place relative to the ion block 8 by a separate clamp 22.

Figure 9:
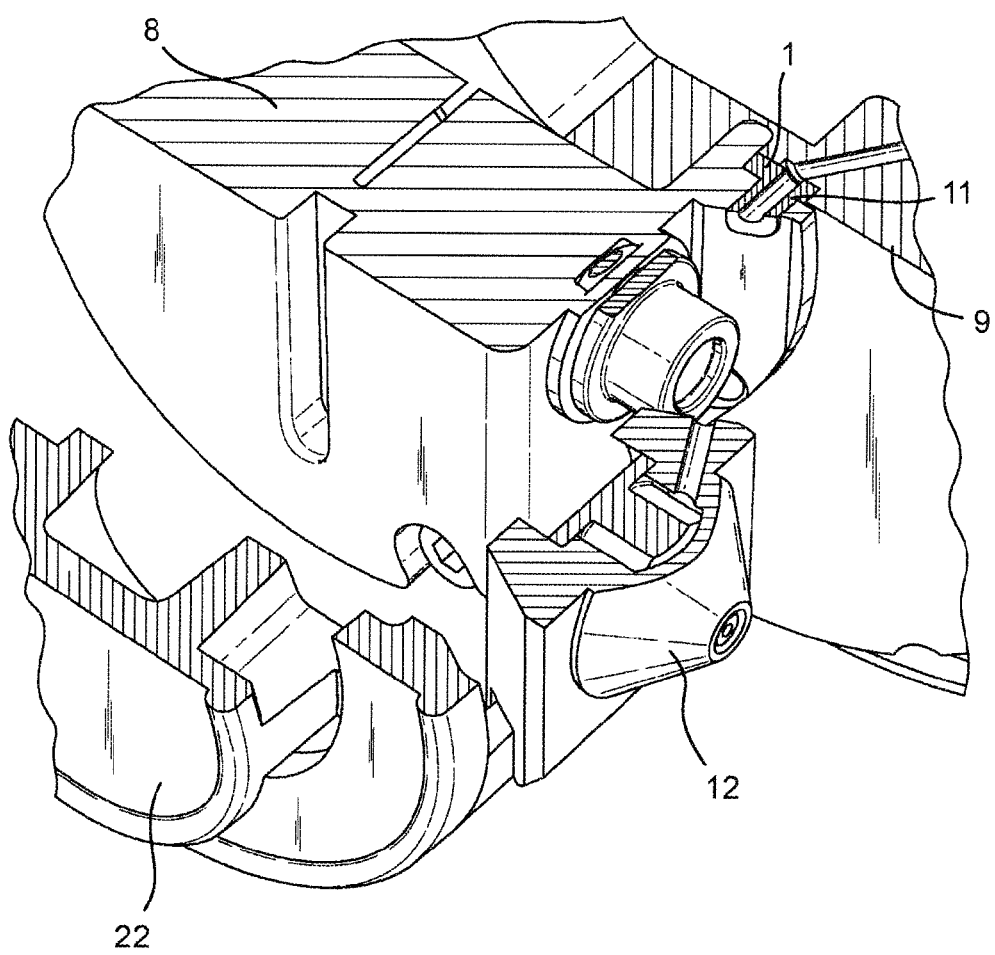
FIG. 9 shows a gasket seal according to an embodiment of the present invention located in a mass spectrometer wherein the gas cone and the clamp have been removed from the ion block.
Figure 10:
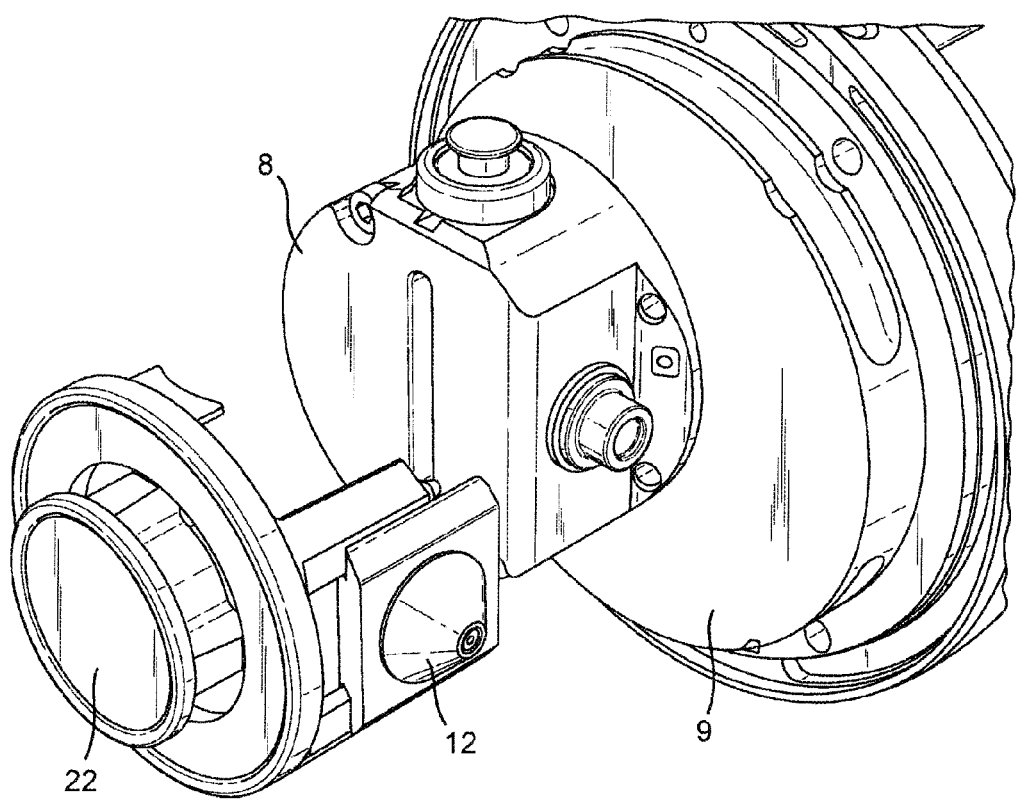
FIG. 10 shows a mass spectrometer according to an embodiment of the present invention wherein the gas cone and the clamp have been removed from the ion block.

FIGS. 9 and 10 show the preferred mass spectrometer of FIG. 8, where the gas cone 12 and clamp 22 have been detached from the ion block 8 and pumping block 9.

The arrangement of the preferred embodiment advantageously avoids the need to clamp the three parts (i.e. the ion block 8, the pumping block 9 and the gas cone 12) together and to provide a plurality of seals at each interface in order to effect a seal.

The preferred embodiment therefore advantageously reduces the number of seals required as well as the number of potential leak points.

Although the present invention has been described with reference to preferred embodiments, it will be understood by those skilled in the art that various changes in form and detail may be made without departing from the scope of the invention as set forth in the accompanying claims.

The invention claimed is:

1. A gasket seal for a mass spectrometer, wherein said gasket seal comprises:
   a membrane having an outer profile and an inner profile; and
   one or more protrusions;
   wherein one or more ports are provided in the body of said membrane, and wherein in use a gas or fluid is supplied through at least one of said one or more ports via at least one of said one or more protrusions.

2. A gasket seal as claimed in claim 1, wherein said membrane is arranged substantially in a first plane, and wherein:
   at least one of said protrusions extends from said membrane in a direction orthogonal to said first plane; and/or
   at least one of said protrusions extends from said membrane in a direction that is not orthogonal to said first plane.

3. A gasket seal as claimed in claim 1, wherein said membrane is arranged substantially in a first plane, and wherein:
   an end surface of at least one of said protrusions is parallel to said first plane; and/or
   an end surface of at least one of said protrusions is not parallel to said first plane.

4. A gasket seal as claimed in claim 3, wherein said end surface of said at least one of said protrusions comprises a sealing surface.

5. A gasket seal as claimed in claim 1, wherein at least a portion of at least one of said protrusions is substantially straight, non-straight, curved, angled or kinked.

6. A gasket seal as claimed in claim 1, wherein said one or more ports are located in said membrane between said outer profile and said inner profile.

7. A gasket seal as claimed in claim 1, wherein said outer profile is substantially circular or non-circular.

8. A gasket seal as claimed in claim 1, wherein said inner profile is substantially circular or non-circular.

9. A gasket seal as claimed in claim 1, wherein at least one of said ports comprises a high pressure gas port or a gas port.

10. A gasket seal as claimed in claim 1, further comprising a device arranged and adapted to supply a cone gas, calibration gas or other gas through said at least one of said one or more ports via said at least one of said one or more protrusions.

11. A gasket seal as claimed in claim 1, wherein at least one of said ports comprises a liquid port.

12. A gasket seal as claimed in claim 11, further comprising a device arranged and adapted to supply a solvent or other liquid through said at least one liquid port.

13. A gasket seal as claimed in claim 1, further comprising one or more apertures provided in the body of said membrane.

14. A gasket seal as claimed in claim 13, wherein said one or more apertures are located between said outer profile and said inner profile.

15. A gasket seal as claimed in claim 13, wherein in use one or more fixings pass through said one or more apertures.

16. A mass spectrometer comprising:
a first component;
a second component; and
a gasket seal as claimed in claim 1, wherein said gasket seal is located between said first component and said second component.

17. A mass spectrometer as claimed in claim 16, wherein said first component comprises a first mating surface and said second component comprises a second mating surface, wherein said gasket seal is arranged and adapted to provide a gas tight seal and/or vacuum seal between said first mating surface and said second mating surface.

18. A mass spectrometer as claimed in claim 17, wherein said gasket seal is arranged and adapted to provide a gas tight seal and/or vacuum seal between said first mating surface and said second mating surface whilst under compression.

19. A mass spectrometer as claimed in claim 16, wherein at least one of said one or more protrusions is arranged and adapted to extend into said first and/or second component.

20. A mass spectrometer as claimed in claim 16, wherein at least one of said one or more protrusions is arranged and adapted to form a seal with surrounding parts or portions of said mass spectrometer.

21. A mass spectrometer as claimed in claim 16, wherein in use said gas is supplied from said first component to said second component or from said second component to said first component through said at least one of said ports via said at least one of said protrusions.

22. A mass spectrometer as claimed in claim 16, wherein said first component comprises an ion block or a first vacuum chamber and said second component comprises a pumping block, a main housing of said mass spectrometer or a second vacuum chamber.

23. A mass spectrometer as claimed in claim 16, further comprising one or more third components, wherein at least one of said one or more protrusions is arranged and adapted to form a seal between said one or more third components and/or said first or second component.

24. A mass spectrometer as claimed claim 23, wherein in use said gas is supplied from said first and/or second component to said one or more third components or from said one or more third components to said first and/or second component through said at least one of said ports via said at least one of said protrusions.

25. A mass spectrometer as claimed in claim 23, wherein said one or more third components comprises an ion inlet assembly.

26. A mass spectrometer as claimed in claim 16, wherein said mass spectrometer comprises a miniature mass spectrometer.

27. A method of assembling a mass spectrometer comprising:
providing a first component;
providing a second component; and
locating a gasket seal as claimed in claim 1 between said first component and said second component.

28. A mass spectrometer comprising:
an ion block having an atmospheric pressure interface;
a housing comprising one or more vacuum chambers; and
a gasket seal located between said ion block and said housing, said gasket seal comprising:
a membrane having an outer profile and an inner profile; and
a protrusion;
wherein a port is provided in the body of said membrane and wherein a gas or fluid is supplied, in use, to said atmospheric pressure interface via said port and said protrusion.

29. A mass spectrometer as claimed in claim 28, wherein said port is located between said outer profile and said inner profile.

30. A method of mass spectrometry comprising:
providing an ion block having an atmospheric pressure interface;
providing a housing comprising one or more vacuum chambers;
locating a gasket seal between said ion block and said housing, said gasket seal comprising a membrane having an outer profile and an inner profile and a protrusion, wherein a port is provided in the body of said membrane; and
supplying a gas or fluid to said atmospheric pressure interface via said port and said protrusion.

* * * * *